United States Patent
Grantham et al.

(10) Patent No.: US 7,159,822 B2
(45) Date of Patent: Jan. 9, 2007

(54) STRUCTURAL PANELS FOR USE IN AIRCRAFT FUSELAGES AND OTHER STRUCTURES

(75) Inventors: Kent Grantham, Seattle, WA (US); Thomas D. Harrison, Seattle, WA (US); Robert M. Kay, Seattle, WA (US); Michael R. Kuss, Seattle, WA (US); William W. Turnmire, Seattle, WA (US); Mark K. Venskus, Seattle, WA (US); Tory R. Whitcomb, Seattle, WA (US); Peter S. Christie, deceased, late of Seattle, WA (US); by Rose Christie, legal representative, Seattle, WA (US)

(73) Assignee: The Boeing Company, Chicago, IL (US)

( * ) Notice: Subject to any disclaimer, the term of this patent is extended or adjusted under 35 U.S.C. 154(b) by 127 days.

(21) Appl. No.: 10/819,084

(22) Filed: Apr. 6, 2004

(65) Prior Publication Data

US 2006/0226287 A1    Oct. 12, 2006

(51) Int. Cl.
*B64C 1/00* (2006.01)

(52) U.S. Cl. .................................................. 244/119
(58) Field of Classification Search .......... 52/664–667, 52/796.12, 797.1, 798.1, 799.13; 244/117 R, 244/119, 123.12, 123.3, 124, 129.1, 131–133
See application file for complete search history.

(56) References Cited

U.S. PATENT DOCUMENTS

| | | | |
|---|---|---|---|
| 2,004 A | | 3/1841 | Harris et al. |
| 1,976,257 A | | 10/1934 | Harper |
| 2,292,372 A | * | 8/1942 | Gerlach et al. ............. 52/798.1 |
| 2,367,750 A | * | 1/1945 | Berkow et al. ............ 244/123.2 |
| 2,387,219 A | | 10/1945 | Neville |
| 2,992,711 A | * | 7/1961 | Mitchell et al. .......... 52/783.19 |
| 3,071,217 A | * | 1/1963 | Gould ......................... 52/403.1 |
| 3,452,501 A | * | 7/1969 | Sickler et al. .............. 52/798.1 |
| 3,490,983 A | | 1/1970 | Lee |
| 3,507,634 A | * | 4/1970 | O'Driscoll .................. 428/573 |
| 3,879,245 A | | 4/1975 | Fetherson et al. |
| 3,976,269 A | * | 8/1976 | Gupta ......................... 244/119 |

(Continued)

FOREIGN PATENT DOCUMENTS

DE    30 40 838 A    5/1982

(Continued)

OTHER PUBLICATIONS

U.S. Appl. No. 10/217,805, Engelbart et al.

(Continued)

*Primary Examiner*—Michael J. Carone
*Assistant Examiner*—John A Radi
(74) *Attorney, Agent, or Firm*—Perkins Coie LLP

(57) ABSTRACT

Structural panels for use in manufacturing aircraft fuselages and other structures are disclosed herein. In one embodiment, a structural panel configured in accordance with the invention includes a skin having at least one offset surface. The structural panel can further include at least first and second stiffeners. The first stiffener can have a first flange portion mated to the skin adjacent to the offset surface. The second stiffener can be spaced apart from the first stiffener and can similarly have a second flange portion mated to the skin adjacent to the offset surface. The structural panel of this embodiment can additionally include a support member mated to the first flange portion of the first stiffener, the second flange portion of the second stiffener, and the offset surface of the skin.

20 Claims, 5 Drawing Sheets

U.S. PATENT DOCUMENTS

| | | | | |
|---|---|---|---|---|
| 3,995,080 | A * | 11/1976 | Cogburn et al. | 428/34.5 |
| 4,064,534 | A | 12/1977 | Chen et al. | |
| 4,186,535 | A * | 2/1980 | Morton | 52/250 |
| 4,310,132 | A | 1/1982 | Frosch | |
| 4,448,838 | A | 5/1984 | McClenahan et al. | |
| 4,463,044 | A | 7/1984 | McKinney | |
| 4,490,958 | A | 1/1985 | Lowe | |
| 4,548,017 | A * | 10/1985 | Blando | 52/798.1 |
| 4,548,859 | A | 10/1985 | Kline | |
| 4,608,220 | A | 8/1986 | Caldwell | |
| 4,631,221 | A * | 12/1986 | Disselbeck et al. | 428/166 |
| 4,693,678 | A | 9/1987 | Von Volkli | |
| 4,699,683 | A | 10/1987 | McCowin | |
| 4,715,560 | A | 12/1987 | Loyek | |
| 4,736,566 | A * | 4/1988 | Krotsch | 52/783.14 |
| 4,760,444 | A | 7/1988 | Nielson | |
| 4,780,262 | A | 10/1988 | Von Volkli | |
| 4,790,898 | A | 12/1988 | Woods | |
| 4,830,298 | A | 5/1989 | Van Blunk | |
| 4,877,471 | A | 10/1989 | McCowin | |
| 4,941,182 | A | 7/1990 | Patel | |
| 5,024,399 | A | 6/1991 | Barquet | |
| 5,058,497 | A | 10/1991 | Bishop | |
| 5,223,067 | A | 6/1993 | Hamamoto et al. | |
| 5,242,523 | A | 9/1993 | Willden et al. | |
| 5,262,220 | A | 11/1993 | Spriggs et al. | |
| 5,337,647 | A | 8/1994 | Roberts | |
| 5,399,406 | A * | 3/1995 | Matsuo et al. | 428/57 |
| 5,439,549 | A | 8/1995 | Fryc | |
| 5,450,147 | A | 9/1995 | Dorsey-Palmateer | |
| 5,518,208 | A | 5/1996 | Roseburg | |
| 5,540,126 | A | 7/1996 | Piramoon | |
| 5,562,788 | A | 10/1996 | Kitson et al. | |
| 5,619,837 | A * | 4/1997 | DiSanto | 52/798.1 |
| 5,622,733 | A * | 4/1997 | Asher | 425/504 |
| 5,651,600 | A | 7/1997 | Dorsey-Palmateer | |
| 5,683,646 | A | 11/1997 | Reiling | |
| 5,700,337 | A | 12/1997 | Jacobs | |
| 5,746,553 | A | 5/1998 | Engwall | |
| 5,765,329 | A * | 6/1998 | Huang | 52/302.3 |
| 5,804,276 | A | 9/1998 | Jacobs | |
| 5,814,386 | A | 9/1998 | Vasiliev | |
| 5,871,117 | A | 2/1999 | Protasov | |
| 5,893,534 | A * | 4/1999 | Watanabe | 244/119 |
| 5,954,917 | A | 9/1999 | Jackson et al. | |
| 5,963,660 | A | 10/1999 | Koontz | |
| 5,979,531 | A | 11/1999 | Barr | |
| 6,012,883 | A | 1/2000 | Engwall | |
| 6,013,341 | A | 1/2000 | Medvedev | |
| 6,045,651 | A | 4/2000 | Kline | |
| 6,074,716 | A | 6/2000 | Tsotsis | |
| 6,086,696 | A | 7/2000 | Gallagher | |
| 6,112,792 | A | 9/2000 | Barr | |
| 6,114,012 | A * | 9/2000 | Amaoka et al. | 428/182 |
| 6,114,050 | A | 9/2000 | Westre et al. | |
| 6,155,450 | A | 12/2000 | Vasiliev et al. | |
| 6,168,358 | B1 | 1/2001 | Engwall | |
| 6,187,411 | B1 * | 2/2001 | Palmer | 428/102 |
| 6,190,484 | B1 | 2/2001 | Appa | |
| 6,205,239 | B1 | 3/2001 | Lin | |
| 6,364,250 | B1 | 4/2002 | Brinck | |
| 6,374,750 | B1 * | 4/2002 | Early | 105/409 |
| 6,390,169 | B1 | 5/2002 | Johnson | |
| 6,415,581 | B1 * | 7/2002 | Shipman et al. | 52/798.1 |
| 6,451,152 | B1 | 9/2002 | Holmes | |
| 6,480,271 | B1 | 11/2002 | Cloud | |
| 6,508,909 | B1 * | 1/2003 | Cerezo Pancorbo et al. | 156/306.6 |
| 6,510,961 | B1 | 1/2003 | Head et al. | |
| 6,511,570 | B1 * | 1/2003 | Matsui | 156/245 |
| 6,613,258 | B1 | 9/2003 | Maison et al. | |
| 6,648,273 | B1 | 11/2003 | Anast | |
| 6,692,681 | B1 | 2/2004 | Lunde | |
| 6,702,911 | B1 * | 3/2004 | Toi et al. | 156/93 |
| 6,730,184 | B1 * | 5/2004 | Kondo et al. | 156/221 |
| 6,766,984 | B1 * | 7/2004 | Ochoa | 244/119 |
| 6,779,707 | B1 * | 8/2004 | Dracup et al. | 228/112.1 |
| 6,786,452 | B1 | 9/2004 | Yamashita et al. | |
| 6,799,619 | B1 | 10/2004 | Holmes et al. | |
| 6,802,931 | B1 * | 10/2004 | Fujihira | 156/292 |
| 6,871,684 | B1 | 3/2005 | Engelbart et al. | |
| 2001/0042186 | A1 | 11/2001 | Iivonen et al. | |
| 2002/0141632 | A1 | 10/2002 | Engelbart | |
| 2003/0080251 | A1 | 5/2003 | Anast | |
| 2003/0145932 | A1 | 8/2003 | Holmes et al. | |
| 2004/0021038 | A1 | 2/2004 | Solanille et al. | |
| 2004/0031567 | A1 | 2/2004 | Engelbart et al. | |
| 2004/0155148 | A1 * | 8/2004 | Folkesson et al. | 244/119 |
| 2005/0211840 | A1 * | 9/2005 | Grether et al. | 244/119 |
| 2005/0224648 | A1 * | 10/2005 | Grether et al. | 244/118.5 |
| 2005/0263645 | A1 * | 12/2005 | Johnson et al. | 244/119 |

FOREIGN PATENT DOCUMENTS

| | | |
|---|---|---|
| DE | 33 31 494 A | 3/1985 |
| EP | 0 319 797 | 6/1989 |
| EP | 0 833 146 | 9/1997 |
| EP | 1 149 687 | 10/2001 |

OTHER PUBLICATIONS

U.S. Appl. No. 10/301,949, Nelson.
U.S. Appl. No. 10/628,691, Engelbart et al.
U.S. Appl. No. 10/630,594, Braun.
U.S. Appl. No. 10/646,316, Engelbart et al.
U.S. Appl. No. 10/646,392, Engwall et al.
U.S. Appl. No. 10/646,509, Johnson et al.
U.S. Appl. No. 10/664,148, Engelbart et al.
U.S. Appl. No. 10/717,030, Johnson et al.
U.S. Appl. No. 10/726,099, Engelbart et al.
U.S. Appl. No. 10/799,306, Engelbart et al.
BAe 146, FLIGHT, International, May 2, 1981.
Beechcraft's Composite Challange, http://www.aerotalk.com/Beech.cfm [accessed Mar. 1, 2004].
Business Aviation, Jun. 7, 2002, http://www.aviationnow.com/avnow/news/channel_busav.jsp?view=story&id=news/btoyo0607.xml [accessed Mar. 1, 2004].
CASA, SAMPE Journal, vol. 39, No. 1, Jan./Feb. 2003, p. 60.
European Search Report for Application No. EP 03 07 8499, Mar. 4, 2004, European Patent Office.
Evans, Don O., "Fiber Placement", 3 pgs, Cincinnati Machine, no date available.
Fiedler, L. et al. "TANGO Composite Fuselage Platform", SAMPE Journal, vol. 39, No. 1, Jan. 2003.
http://www.cinmach.com/compnews/PressReleases/pro00-11.html; Raytheon Aircraft Orders Four More Fiber Cincinnati Fiber Placement Systems for Industry's First Composite-Fuselage Business Jets, 2 pgs.
http://www.cinmach.com/WolfTracks4_/MTG_WT7.Html; Premier 1 Features Lighter, Stronger All Composite Fuselage, 3 pgs.
Raytheon, Mar. 2000, vol. 4, No. 2, http://www.cts.com/king/vasci/newsletter/vol42.html [accessed Mar. 1, 2004].
Rocky Mountain Composites, http://www.rockymountain.composites.com/wind_sys.htm [accessed Feb. 28, 2004].
Sharp et al; "Material Selection/Fabrication Issues for Thermoplastic Fiber Placement", Journal of Thermoplastic Composite Materials, vol. 8; Jan. 1995, pp. 2-14.
Systems and Methods for Using Light to Indicate Defect Locations on a Composite Structure, (51 pgs).
The Barrelful of Experience, Intervia, May 1992, 2 pgs.
U.S. Appl. No. 10/822,538, Engelbart et al.
U.S. Appl. No. 10/846,974, Engelbart et al.

Grimshaw, Michael N. et al. "Advanced Technology Tape Laying for Affordable Manufacturing of Large Composite Structures," (11pgs); http://www.cinmach.com/tech/pdf/TapeLayingGrimshaw.pdf.

Grimshaw, Michael N., "Automated Tape Laying," (6 pgs); http://www.cinmach.com/tech/pdf/Grimshaw%20ASM%20Handbook.pdf.

http://www.rockymountaincomposites.com/wind_sys.html; Filament Winding, 2 pgs.

International Search Report and Written Opinion for PCT/US2004/039905; Applicant: The Boeing Company; May 25, 2005; 10 pgs.

Premier I Feature Lighter, Stronger All-Composite Fuselage, WolfTracks, vol. 4, No. 1, http://www.cinmach.com/wolfTracks4_1/MTG_WT7.htm [accessed Mar. 25, 2004].

Prof. J. Zhang: "Angewandte Sensorik" CH 4. Sensoren in Der Robotik, Nov. 11, 2003, pp. 76-113; XP002327793; URL:http://tech-www.informatik.uni-hamburg.de/lehre/ws2003/voriesungen/angewandte_sensorik/vorlesung_03.pdf, accessed Apr. 2004.

Raytheon Aircraft Orders Four More Fiber Cincinnati Fiber Placement System for Industry's First Composite-Fuselage Business Jets, http://www.cinmach.com/compnews/PressReleases/pr00-11.htm [accessed Mar. 25, 2004].

U.S. Appl. No. 60/559,890, Biornstad et al.

U.S. Appl. No. 60/559,911, Johnson et al.

U.S. Appl. No. 10/949,848, Stulc.

U.S. Appl. No. 10/851,381, Biornstad et al.

U.S. Appl. No. 10/996,922, filed Mar. 25, 2006, Chapman.

Raytheon Aircraft's Hawker Horizon Reaches Fuselage Milestone, Raytheon News Release; http://www.beechcraft.de/Presse/2000/100900b.htm; [accessed Jun. 26, 2004] (2 pages).

* cited by examiner

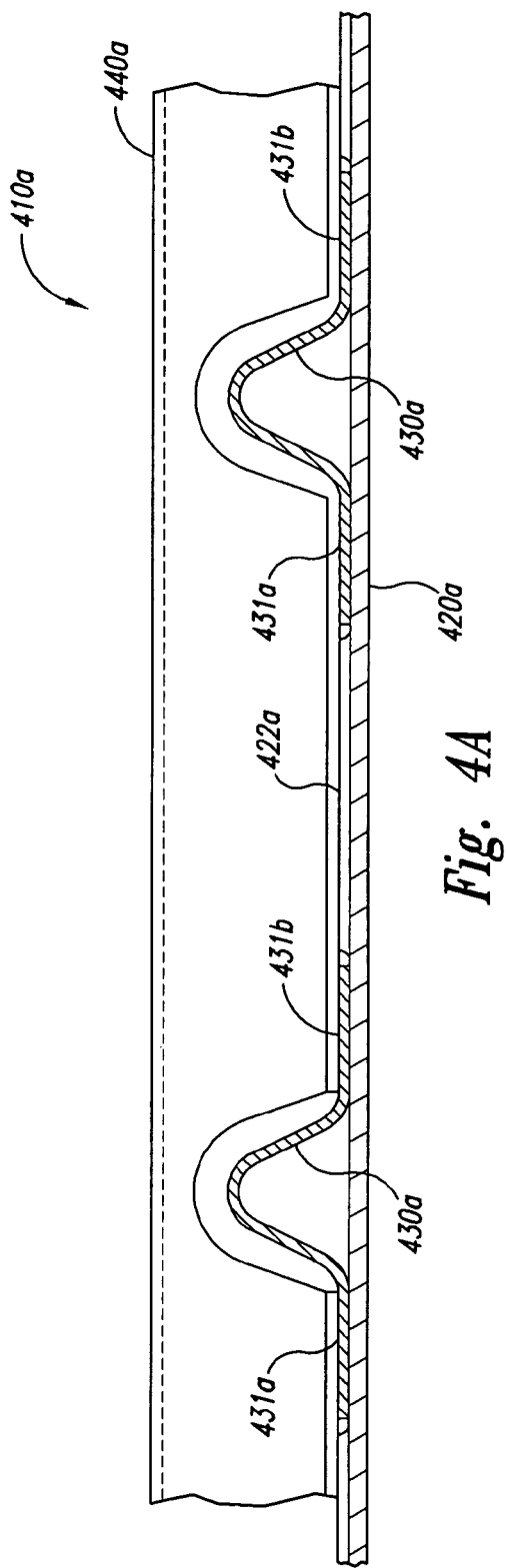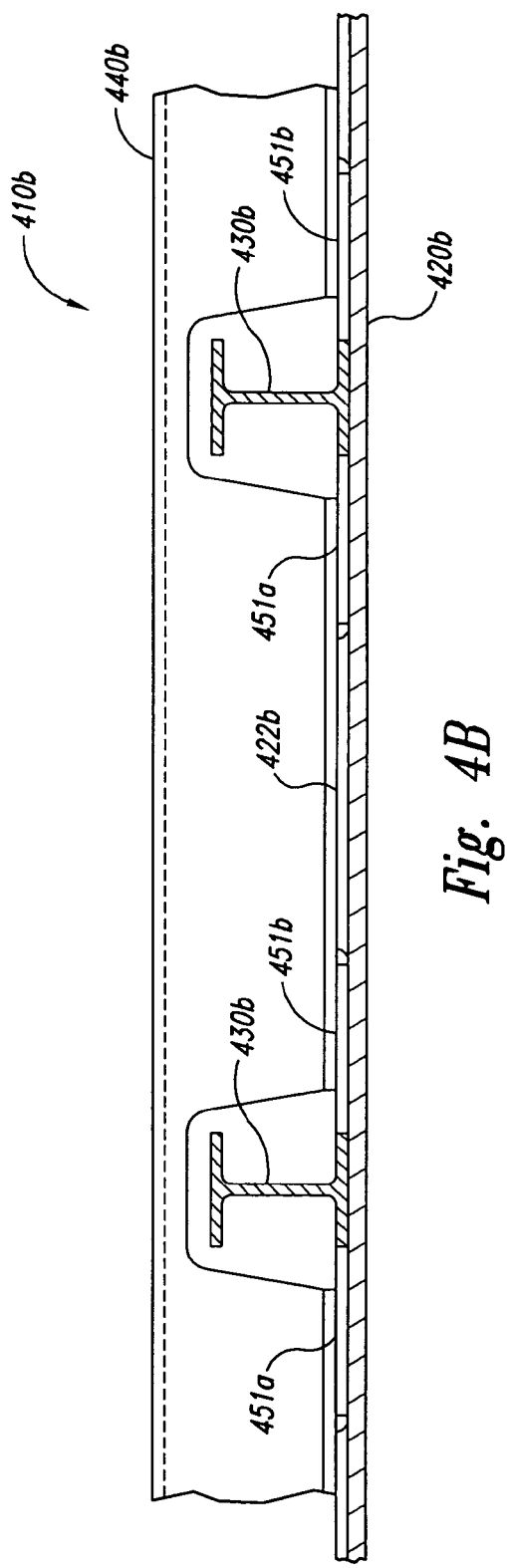

STRUCTURAL PANELS FOR USE IN AIRCRAFT FUSELAGES AND OTHER STRUCTURES

TECHNICAL FIELD

The following disclosure relates generally to structural panels and, more particularly, to structural panels for use in aircraft fuselages and other structures.

BACKGROUND

Conventional semi-monocoque panels used in aircraft fuselages typically include a plurality of longitudinal stiffeners or stringers attached to an inner surface of a skin. Circumferential frames extending transverse to the stringers are typically attached to the inner surface of the skin at longitudinally spaced-apart intervals to give the fuselage its cross-sectional shape. The frames often include openings or "mouse holes" through which the stringers extend, and the panel often includes a plurality of small clips or shear ties fastening the frames to the stringers at the mouse holes. While such panels can be relatively strong and lightweight, conventional methods for manufacturing such panels are typically labor-intensive because of the number of parts that must be assembled.

FIG. 1 is an isometric view of a semi-monocoque aircraft panel 100 configured in accordance with the prior art. The panel 100 includes a frame 106 and a plurality of stringers 104 attached to a skin 102. The stringers 104 are "hat-section" stringers having a raised portion 103 and opposing flange portions 105. The flange portions 105 are attached directly to the skin 102.

The frame 106 includes a base portion 109 and an upstanding portion 110. The upstanding portion 110 includes a plurality of mouse holes 114 through which the raised portions 103 of the stringers 104 extend. The base portion 109 is attached to the stringer flange portions 105 and the skin 102. The base portion 109 includes a plurality of steps or "joggles" 112 positioned just outboard of the stringer flange portions 105. The joggles 112 allow the base portion 109 to step off the stringer flange portions 105 and onto the skin 102. This allows the base portion 109 to be fastened directly to the skin 102 between the stringers 104 without causing gaps or excessive preload between the base portion 109 and the skin 102.

One shortcoming of the prior art panel 100 is the manufacturing cost. Forming the joggles 112 in the frame 106, for example, adds additional cost when compared to a similar frame without joggles. This is especially true if the frame 106 is manufactured from composite materials rather than metal, because forming joggles in composite materials typically requires special tooling and/or a post-cure machining process.

SUMMARY

The present invention is directed generally toward structural panels for use in manufacturing aircraft and other structures. A structural panel configured in accordance with one aspect of the invention includes a skin having at least one offset surface and at least first and second stiffeners. The first stiffener can have a first flange portion mated to the skin adjacent to the offset surface. The second stiffener can be spaced apart from the first stiffener and can have a second flange portion mated to the skin adjacent to the offset surface. The structural panel can further include a frame having a base portion mated to the first flange portion of the first stiffener, the offset surface of the skin, and the second flange portion of the second stiffener.

In one aspect of this embodiment, the base portion of the frame can include a mating surface without a joggle. The mating surface can mate to the first flange portion of the first stiffener, the second flange portion of the second stiffener, and the offset surface of the skin. In another aspect of this embodiment, the first flange portion of the first stiffener, the second flange portion of the second stiffener, and the offset surface of the skin can form an at least approximately continuous support surface to which the base portion of the frame mates.

A method for manufacturing a structural panel in accordance with another aspect of the invention includes mating at least a first flange portion of a first stiffener to a first surface of a skin and adjacent to a second surface of the skin. The second surface of the skin can be offset with respect to the first surface of the skin. The method can further include mating at least a second flange portion of a second stiffener to the first surface of the skin and adjacent to the second surface of the skin. The method can additionally include mating a frame to the first flange portion of the first stiffener, the second flange portion of the second stiffener, and the second surface of the skin.

BRIEF DESCRIPTION OF THE DRAWINGS

FIGS. 4A and 4B are cross-sectional end views of portions of structural panels configured in accordance with other embodiments of the invention.

DETAILED DESCRIPTION

The following disclosure describes structural panels for use in manufacturing aircraft and other structures. Certain details are set forth in the following description and in FIGS. 2–4B to provide a thorough understanding of various embodiments of the invention. Other details describing well-known structures and systems often associated with aircraft structures and materials are not set forth in the following disclosure to avoid unnecessarily obscuring the description of the various embodiments of the invention.

Many of the details, dimensions, angles, and other features shown in the Figures are merely illustrative of particular embodiments of the invention. Accordingly, other embodiments can have other details, dimensions, angles, and features without departing from the spirit or scope of the present invention. In addition, further embodiments can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 210 is first introduced and discussed with reference to FIG. 2.

Figure 1:
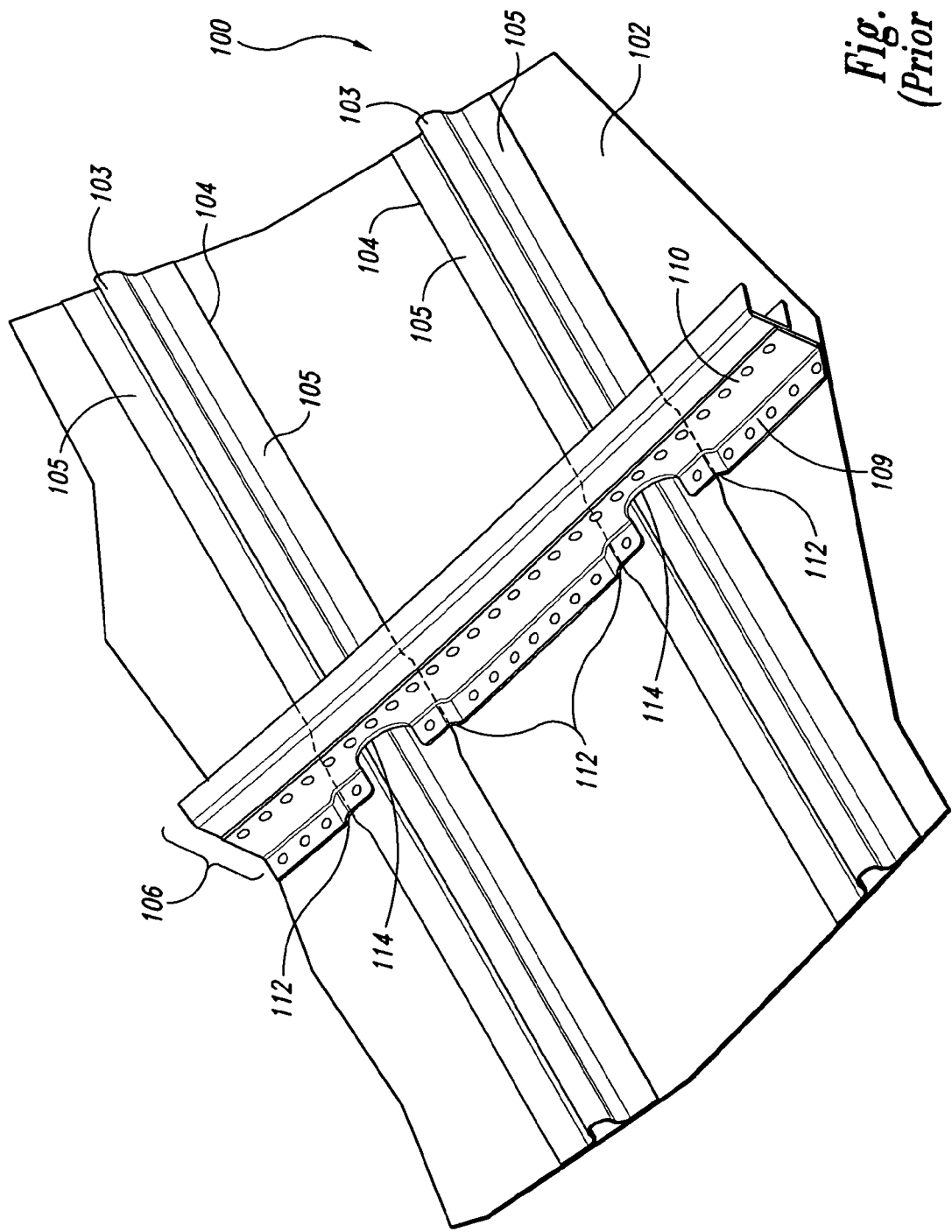
FIG. 1 is an isometric view of a semi-monocoque aircraft panel configured in accordance with the prior art.
Figure 2:
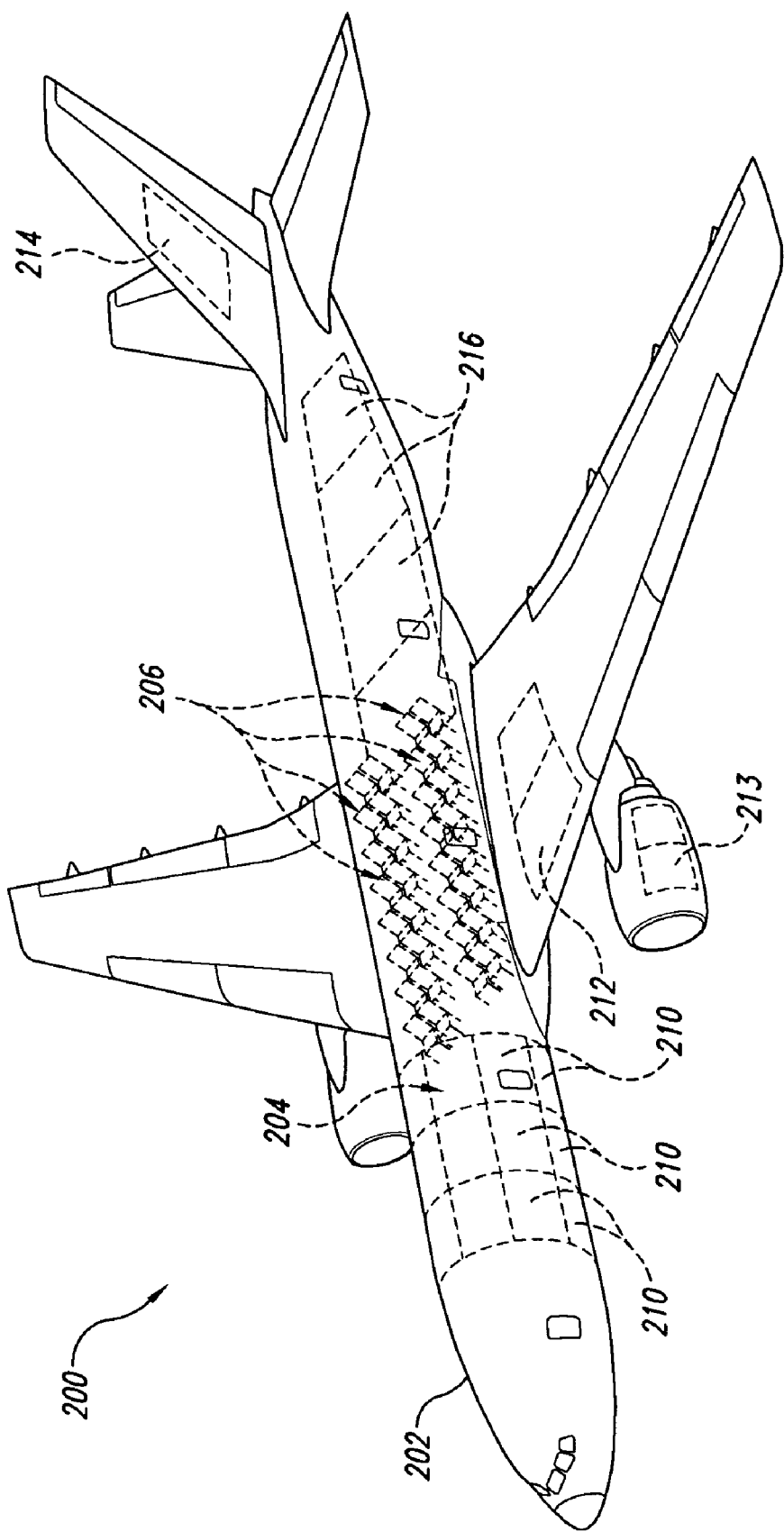
FIG. 2 is a partially hidden isometric view of an aircraft having a fuselage that includes a plurality of structural panels configured in accordance with an embodiment of the invention.

FIG. 2 is a partially hidden isometric view of an aircraft 200 having a fuselage 202 that includes a plurality of structural panels 210 configured in accordance with an embodiment of the invention. In one aspect of this embodiment, the structural panels 210 are operably coupled together to form an exterior portion of the fuselage 202 adjacent to an interior portion 204. The interior portion 204 can include a passenger cabin configured to hold a plurality of passenger seats 206 ranging in number from about 50 to about 700 seats, e.g., from about 100 to about 600 seats. In another aspect of this embodiment, the structural panels 210 can be composed largely of metallic materials such as aluminum, titanium, and/or steel. In other embodiments, the structural panels 210 can include one or more composite materials, such as graphite-epoxy materials.

In a further aspect of this embodiment, the aircraft 200 can also include one or more wing panels 212, nacelle panels 213, and/or stabilizer panels 214. Each of the foregoing panels 212–214 can be at least generally similar in structure and function to the structural panel 210. Accordingly, the use of the structural panel 210 or variations thereof is not limited to the fuselage 202, but also extends to other portions of the aircraft 200 that utilize structural panels. Further, the use of such panels is not limited to exterior portions of the aircraft 200, but can extend to interior structural and/or nonstructural portions. For example, in one embodiment, the aircraft 200 can further include a plurality of floor panels 216 forming a floor portion of the interior portion 204. The floor panels 216 can be at least generally similar in structure and function to the structural panels 210.

Figure 3A:
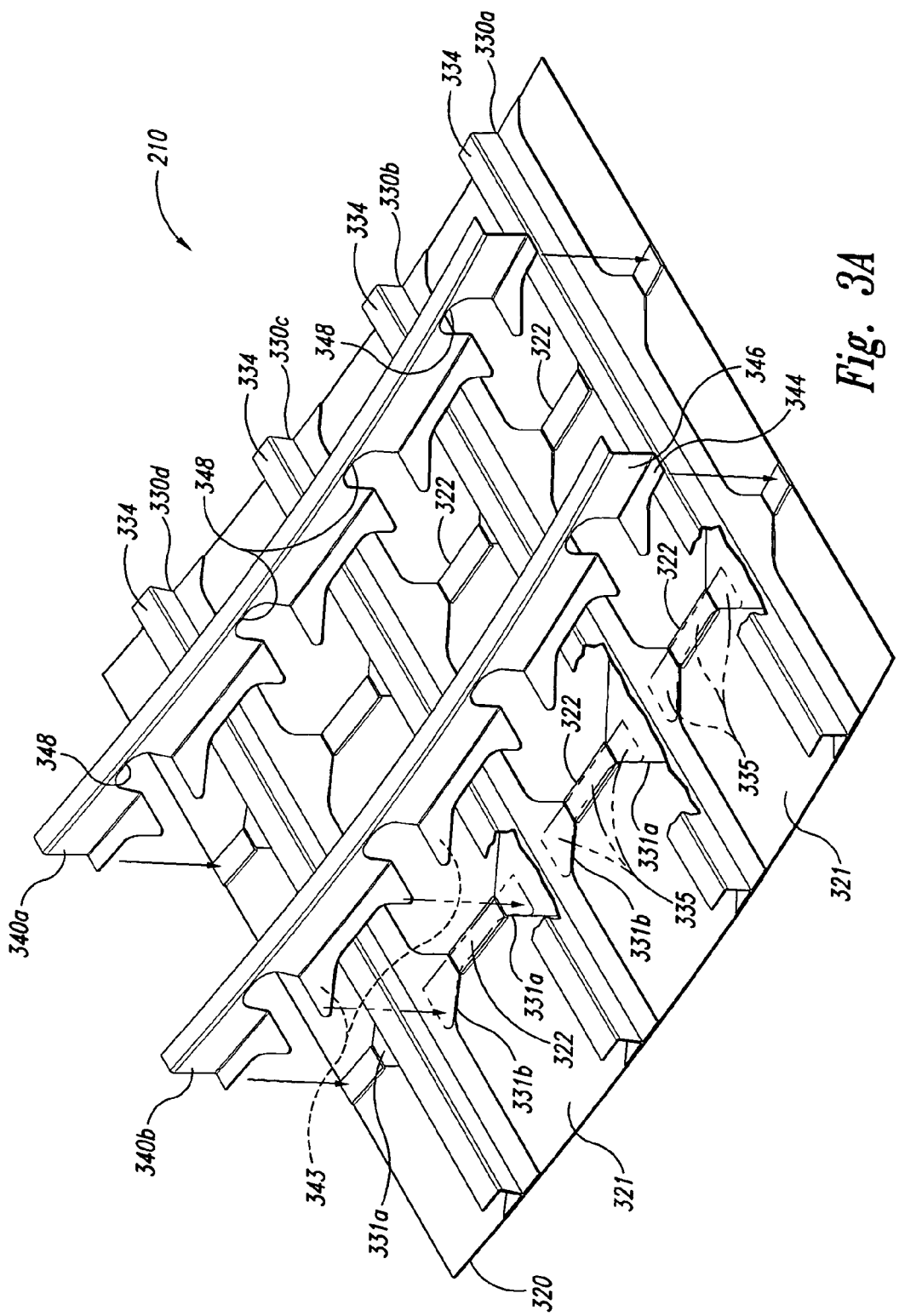
FIGS. 3A and 3B are a partially exploded isometric view and an assembled isometric view, respectively, of a structural panel configured in accordance with an embodiment of the invention.
Figure 3B:
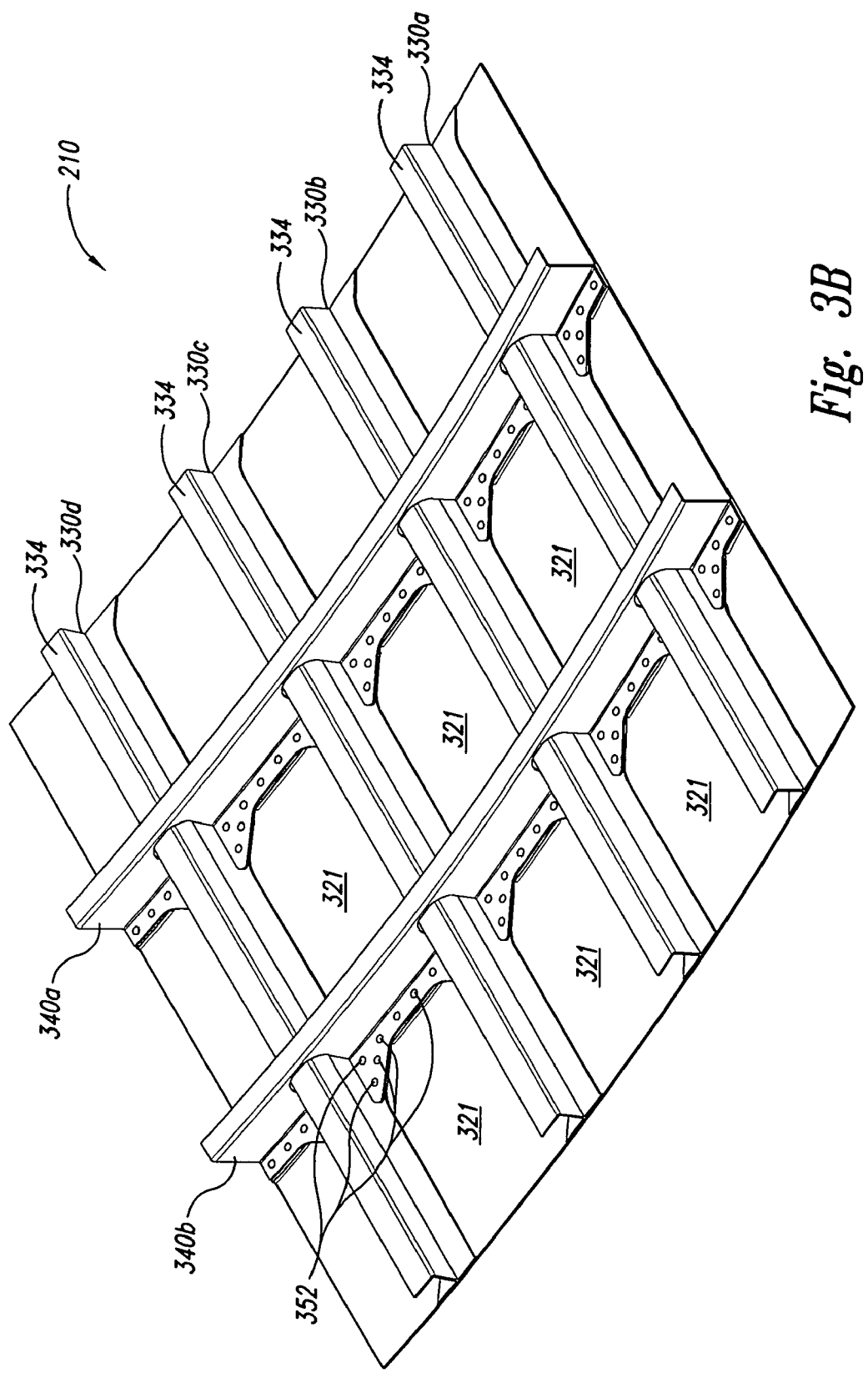

FIGS. 3A and 3B are a partially exploded isometric view and an assembled isometric view, respectively, of the structural panel 210 configured in accordance with an embodiment of the invention. Although the structural panel 210 can be generally flat in certain embodiments, in FIGS. 3A and 3B the structural panel 210 is curved to form part of a cylindrical surface, such as an exterior surface of a fuselage. Referring to FIGS. 3A and 3B together, the structural panel 210 can include a plurality of stiffeners 330 (identified individually as stiffeners 330a–d) attached to a first surface 321 of a skin 320. Each of the stiffeners 330 can include a raised portion 334 projecting away from the skin 320 and a plurality of flange portions 331 (identified as a plurality of first flange portions 331a extending outwardly from one side of the stiffener 330, and a plurality of second flange portions 331b extending outwardly from an opposite side of the stiffener 330). The flange portions 331 can be mated directly to the first surface 321 of the skin 320. In the illustrated embodiment, the stiffeners 330 have Z-shaped, or at least partial Z-shaped, cross-sections. In other embodiments described below, however, the stiffeners 330 can have other cross-sectional shapes including C-shapes, L-shapes, T-shapes, etc.

In one embodiment, the stiffeners 330 and the skin 320 can include metallic materials. In this embodiment, the stiffeners 330 can be riveted or otherwise mechanically fastened to the skin 320. Alternatively, the stiffeners 330 can be welded to the skin 320. In another embodiment, the skin 320 and the stiffeners 330 can include composite materials, such as graphite-epoxy materials. In this embodiment, the stiffeners 330 can be adhesively bonded to the skin 320. For example, in one embodiment, the stiffeners 330 can be bonded to the skin 320 during a co-curing process in which the stiffeners 330 and the skin 320 are co-cured (i.e., cured together) at an elevated temperature and pressure.

In another aspect of this embodiment, the skin 320 further includes a series of second surfaces 322 positioned adjacent to the flange portions 331 of the stiffeners 330. The second surfaces 322 can be offset from the first surface 321 in a direction generally normal to the first surface 321 so that the second surfaces 322 combine with the corresponding first and second flange portions 331 to form a series of at least approximately continuous base surfaces 335 extending between the stiffeners 330. In one embodiment, the offset between the first surface 321 and the second surfaces 322 can be produced by chemically milling material (e.g., metal) off the skin 320 around the second surfaces 322. In other embodiments, the offset can be produced by other methods, such as by forming during the initial skin rolling process, casting, and/or machining. In a further embodiment, the skin 320 can include composite materials and the offset can be produced by suitable composite manufacturing methods including, for example, using ply drop-offs.

In a further aspect of this embodiment, the structural panel 210 additionally includes a plurality of support members, e.g., frames 340 (identified individually as a first frame 340a and a second frame 340b). In the illustrated embodiment, the frames 340 are single-piece frames having Z-shaped cross-sections that are roll-formed from sheet aluminum. In other embodiments, the structural panel 210 can include single and multi-piece frames composed of different materials (e.g., composite materials), and/or having different cross-sectional shapes.

Each of the frames 340 can include a base portion 344 and an upstanding portion 346 projecting away from the base portion 344. The upstanding portion 346 can include a plurality of openings, e.g., mouse holes 348, through which the raised portions 334 of the stiffeners 330 extend. The mouse holes 348 can be shaped and sized to accommodate the particular type of stiffener being used and to facilitate effective attachment of the base portion 344 to the stiffener flange portions. The base portion 344 can include a plurality of mating surfaces 343 extending between the mouse holes 348. The mating surfaces 343 are configured to contact corresponding base surfaces 335 extending between the stiffeners 330. The mating surfaces 343 of the illustrated embodiment do not have any joggles or steps because the base surfaces 335 to which they mate are at least approximately continuous between the stiffeners 330 and do not include any significant surface steps or misalignments. An advantage of this feature is that it avoids the added costs associated with manufacturing frames with joggles, steps, or other offsets in the mating surfaces. Such costs may be particularly significant when working with composite materials because, unlike metals, which are malleable and can be easily formed, creating joggles or steps in composite surfaces typically requires special tooling and/or post-cure machining.

In one embodiment, the frames 340 can be fastened to the skin 320 and the flange portions 331 with a series of suitable fasteners 352. The Z-shaped cross-sections of the frames 340 can facilitate installation of the fasteners 352 by providing clearance for fastener installation tools. In another embodiment, the frames 340 can be adhesively bonded to the skin 320 and the flange portions 331.

One feature of the embodiment of the structural panel 210 described above is that it does not require individual clips to attach the frames 340 or portions thereof to the stiffeners 330. Another feature of this embodiment is that individual shear ties are not required to attach the frames 340 or portions thereof to the skin 320. One advantage of these features is that the structural panel 210 can be relatively easy and inexpensive to manufacture. A further feature of the structural panel 210 is that the base portions 344 of the frames 340 can provide structural continuity across the skin 320 and serve as "fail-safe chords" that enhance damage resistance.

FIGS. 4A and 4B are cross-sectional end views of portions of structural panels 410a and 410b, respectively, configured in accordance with other embodiments of the invention. Referring first to FIG. 4A, in one aspect of this embodiment, the structural panel 410a includes a plurality of hat-section stiffeners 430a attached to a skin 420a. The hat-section stiffeners 430a can include a plurality of outwardly extending flange portions 431 (identified as first flange portions 431a and second flange portions 431b) that are at least generally similar in structure and function to the corresponding flange portions 331 described above with reference to FIGS. 3A and 3B. The skin 420a can include a plurality of offset surfaces 422a that are at least generally similar in structure and function to the second surfaces 322 described above with reference to FIGS. 3A and 3B. In another aspect of this embodiment, the structural panel 410a further includes a frame 440a that mates to the flange portions 431 and the offset surfaces 422a as described above with reference to FIGS. 3A and 3B.

Referring next to FIG. 4B, in one aspect of this embodiment, the structural panel 410b includes a plurality of I-section stiffeners 430b attached to a skin 420b. The I-section stiffeners 430b can include a plurality of outwardly extending flange portions 451 (identified as first flange portions 451a and second flange portions 451b) that are at least generally similar in structure and function to the corresponding flange portions 331 described above with reference to FIGS. 3A and 3B. The skin 420b can include a plurality of offset surfaces 422b that are at least generally similar in structure and function to the second surfaces 322 described above with reference to FIGS. 3A and 3B. In another aspect of this embodiment, the structural panel 410b further includes a frame 440b that mates to the flange portions 451 and the offset surfaces 422b as described above with reference to FIGS. 3A and 3B.

Various components described herein may be manufactured and/or assembled in accordance with the teachings of copending U.S. Provisional Patent Application No. 60/559,890, entitled "COMPOSITE BARREL SECTIONS FOR AIRCRAFT FUSELAGES AND OTHER STRUCTURES, AND METHODS AND SYSTEMS FOR MANUFACTURING SUCH BARREL SECTIONS," and/or copending U.S. Provisional Patent Application No. 60/559,911, entitled "STRUCTURAL PANELS FOR USE IN AIRCRAFT FUSELAGES AND OTHER STRUCTURES," both of which were filed concurrently herewith and are incorporated herein in their entireties by reference.

Further, the subject matter of copending U.S. patent application Ser. No. 10/646,509, entitled "MULTIPLE HEAD AUTOMATED COMPOSITE LAMINATING MACHINE FOR THE FABRICATION OF LARGE BARREL SECTION COMPONENTS," filed Aug. 22, 2003; Ser. No. 10/717,030, entitled "METHOD OF TRANSFERRING LARGE UNCURED COMPOSITE LAMINATES," filed Nov. 18, 2003; Ser. No. 10/646,392, entitled "AUTOMATED COMPOSITE LAY-UP TO AN INTERNAL FUSELAGE MANDREL," filed Aug. 22, 2003; Ser. No. 10/630,594, entitled "COMPOSITE FUSELAGE MACHINE," filed Jul. 28, 2003; Ser. No. 10/646,316, entitled "UNIDIRECTIONAL, MULTI-HEAD FIBER PLACEMENT," filed Aug. 22, 2003; entitled "SYSTEMS AND METHODS ENABLING AUTOMATED RETURN TO AND/OR REPAIR OF DEFECTS WITH A MATERIAL PLACEMENT MACHINE," filed Mar. 12, 2004; Ser. No. 10/726,099, entitled "SYSTEMS AND METHODS FOR DETERMINING DEFECT CHARACTERISTICS OF A COMPOSITE STRUCTURE," filed Dec. 2, 2003; and Ser. No. 10/628,691, entitled "SYSTEMS AND METHODS FOR IDENTIFYING FOREIGN OBJECTS AND DEBRIS (FOD) AND DEFECTS DURING FABRICATION OF A COMPOSITE STRUCTURE," filed Jul. 28, 2003, are incorporated herein in their entireties by reference.

From the foregoing, it will be appreciated that specific embodiments of the invention have been described herein for purposes of illustration, but that various modifications may be made without deviating from the spirit and scope of the invention. For example, although the various structural panels described above have been described in the context of aircraft structures, in other embodiments, such panels can be used in other structural applications. Accordingly, the invention is not limited, except as by the appended claims.

We claim:

1. A structural panel comprising:
a skin having at least one offset surface;
a first stiffener having a first flange portion mated to the skin adjacent to the offset surface;
at least a second stiffener spaced apart from the first stiffener, the second stiffener having a second flange portion mated to the skin adjacent to the offset surface; and
a support member mated to the first flange portion of the first stiffener, the second flange portion of the second stiffener, and the offset surface of the skin, wherein the offset surface is a first surface associated with a first skin thickness, wherein the skin further includes a second surface associated with a second skin thickness that is less than the first thickness, and wherein the first and second stiffeners are mated to the second surface.

2. The structural panel of claim 1 wherein the support member includes a mating surface without a joggle or a step, and wherein the mating surface mates to the first flange portion of the first stiffener, the second flange portion of the second stiffener, and the offset surface of the skin.

3. The structural panel of claim 1 wherein the first flange portion of the first stiffener, the second flange portion of the second stiffener, and the offset surface of the skin form an at least approximately continuous support surface, and wherein the support member mates to the at least approximately continuous support surface.

4. The structural panel of claim 1 wherein the first stiffener further includes a first raised portion projecting away from the skin, wherein the second stiffener further includes a second raised portion projecting away from the skin, and wherein the support member further includes at least first and second openings, wherein the first raised portion of the first stiffener extends through the first opening and the second raised portion of the second stiffener extends through the second opening.

5. The structural panel of claim 1 wherein the offset surface of the skin is a first offset surface, wherein the skin further includes a second offset surface spaced apart from the first offset surface, wherein the structural panel further includes a third stiffener spaced apart from the second stiffener, the third stiffener having a third flange portion mated to the skin adjacent to the second offset surface, and wherein the support member mates to the first flange portion of the first stiffener, the second flange portion of the second stiffener, the third flange portion of the third stiffener, the first offset surface of the skin, and the second offset surface of the skin.

6. The structural panel of claim 1 wherein the support member is a sheet metal frame.

7. The structural panel of claim 1 wherein the support member has a Z-shaped cross-section.

8. The structural panel of claim 1 wherein the skin includes at least one chemically milled surface adjacent to the offset surface.

9. The structural panel of claim 1 wherein the first and second stiffeners are adhesively bonded to the skin adjacent to the offset surface.

10. The structural panel of claim 1 wherein the first and second stiffeners are mechanically fastened to the skin adjacent to the offset surface.

11. The structural panel of claim 1 wherein the first and second stiffeners are welded to the skin adjacent to the offset surface.

12. The structural panel of claim 1 wherein the second surface is offset from the first surface in a direction at least generally normal to the first surface.

13. The structural panel of claim 1 wherein the first and second surfaces are integral portions of the skin.

14. A fuselage comprising:
    an interior portion; and
    a plurality of structural panels operably coupled together to enclose the interior portion, wherein each of the structural panels includes:
        a skin having at least one offset surface;
        a first stiffener having a first flange portion mated to the skin adjacent to the offset surface;
        at least a second stiffener spaced apart from the first stiffener, the second stiffener having a second flange portion mated to the skin adjacent to the offset surface; and
        a support member mated to the first flange portion of the first stiffener, the second flange portion of the second stiffener, and the offset surface of the skin, wherein the support member includes a mating surface without a joggle, and wherein the mating surface mates to the first flange portion of the first stiffener, the second flange portion of the second stiffener, and the offset surface of the skin.

15. The aircraft fuselage of claim 14 wherein the skin includes a composite material.

16. A fuselage comprising:
    an interior portion, and
    a plurality of structural panels operably coupled together to enclose the interior portion, wherein each of the structural panels includes:
        a skin having at least one offset surface;
        a first stiffener having a first flange portion mated to the skin adjacent to the offset surface;
        at least a second stiffener spaced apart from the first stiffener, the second stiffener having a second flange portion mated to the skin adjacent to the offset surface; and
        a support member mated to the first flange portion of the first stiffener, the second flange portion of the second stiffener, and the offset surface of the skin, wherein the support member includes a mating surface without a step, and wherein the mating surface mates to the first flange portion of the first stiffener, the second flange portion of the second stiffener, and the offset surface of the skin.

17. The aircraft fuselage of claim 16, further comprising a plurality of passenger seats positioned in the interior portion ranging in number from about 100 seats to about 700 seats, and wherein the skin and stiffeners include composite materials.

18. A fuselage comprising:
    an interior portion; and
    a plurality of structural panels operably coupled together to enclose the interior portion, wherein each of the structural panels includes:
        a skin having at least one offset surface;
        a first stiffener having a first flange portion mated to the skin adjacent to the offset surface;
        at least a second stiffener spaced apart from the first stiffener, the second stiffener having a second flange portion mated to the skin adjacent to the offset surface; and
        a support member mated to the first flange portion of the first stiffener, the second flange portion of the second stiffener, and the offset surface of the skin, wherein the first flange portion of the first stiffener, the second flange portion of the second stiffener, and the offset surface of the skin form an at least approximately continuous support surface, and wherein the support member mates to the at least approximately continuous support surface.

19. The aircraft fuselage of claim 18 wherein the plurality of structural panels are operably coupled together to form an exterior portion of a passenger cabin.

20. The aircraft fuselage of claim 18, further comprising a plurality of passenger seats positioned in the interior portion ranging in number from about 100 seats to about 700 seats.

* * * * *